United States Patent [19]

Umeda

[11] Patent Number: 5,157,234
[45] Date of Patent: Oct. 20, 1992

[54] C-TYPE WELDING GUN ROBOT HOLDING APPARATUS

[75] Inventor: Shigeru Umeda, Tokyo, Japan

[73] Assignee: Obara Corporation, Tokyo, Japan

[21] Appl. No.: 754,761

[22] Filed: Sep. 4, 1991

[30] Foreign Application Priority Data

Jan. 24, 1991 [JP] Japan ................................. 3-6425[U]

[51] Int. Cl.⁵ .............................................. B23K 11/10
[52] U.S. Cl. .................................. 219/89; 219/86.25; 219/90
[58] Field of Search .................... 219/89, 86.25, 86.33, 219/90, 116; 901/42

[56] References Cited

U.S. PATENT DOCUMENTS

| | | |
|---|---|---|
| 4,861,959 | 8/1989 | Cecil ........................................ 219/89 |
| 5,026,963 | 6/1991 | Saito et al. .............................. 219/89 |
| 5,091,623 | 2/1992 | Obara et al. ............................ 219/89 |

FOREIGN PATENT DOCUMENTS

| | | | |
|---|---|---|---|
| 3707572 | 9/1988 | Fed. Rep. of Germany | 219/90 |
| 2459105 | 2/1981 | France | 219/90 |
| 55-153684 | 11/1980 | Japan | 219/86.25 |
| 60-36349 | 8/1985 | Japan | 219/86.25 |

Primary Examiner—Geoffrey S. Evans
Attorney, Agent, or Firm—Flynn, Thiel, Boutell & Tanis

[57] ABSTRACT

A C-type welding robot gun holding apparatus having a pressure cylinder which is short in the longitudinal direction thereof and a welding robot gun which is low in height. The C-type welding robot gun holding apparatus comprises an L-shaped bracket fixed to a tip end of a robot wrist and having a projection, a fixing cylinder disposed over the pressure cylinder having a rod which is disposed in confronting relation with a front surface of the projection at a tip end of the rod and a stopper provided at a stopper holding member protruding from the rear end of the pressure cylinder being directed toward a rear surface of the projection.

2 Claims, 2 Drawing Sheets

C-TYPE WELDING GUN ROBOT HOLDING APPARATUS

BACKGROUND OF THE INVENTION

1. Field of the Invention

The present invention relates to a C-type welding robot gun holding apparatus, particularly to an apparatus for fixing an equalizer when a C-type welding robot gun is free from operation.

2. Prior Art.

A conventional apparatus for fixing the equalizer when the C-type welding robot gun is free from operation is typically illustrated in FIGS. 2 and 3.

In the first conventional apparatus as illustrated in FIG. 2, a bracket 23 is fixed to a tip end of a robot wrist 21 for holding a fixing cylinder 22 and stopper holding members 25 and 26 protrude from a middle portion and a rear end of a pressure cylinder 24. Stoppers 27 and 28 are held by the stopper holding members 25 and 26 in which a rod 30 of the fixing cylinder 22 is permitted to bring into contact with the stopper 27 while a rear wall 29 of the bracket 23 is permitted to bring into contact with the stopper 28. When the C-type welding robot gun 31 is free from operation and is moved by the robot, a rod 30 of the fixing cylinder 22 extends to bring into contact with the stopper 27 while the rear wall 29 brings into contact with the stopper 28 whereby the C-type welding robot gun 31 is fixedly held by the robot.

In the second conventional apparatus as illustrated in FIG. 3, a hollow square stopper holding member 42 is fixed to a tip end of a robot wrist 41 and has front and rear walls 43 and 44 provided with stoppers 45 and 46. A pressure cylinder 47 has a protruding portion 48 to which a fixed arm 49 and a fixing cylinder 50 are fixed. A rod 51 of the fixing cylinder 50 is permitted to bring into contact with the stopper 45 while the protruding portion 48 is permitted to bring into contact with the stopper 45. When a C-type welding robot gun 52 is free from operation and is moved by the robot, the rod 51 extends to bring into contact with the stopper 46 while a front surface 53 of the protruding portion 48 brings into contact with the stopper 45 whereby the C-type welding robot gun is fixedly held by the robot.

However, there was such a problem in the first conventional apparatus that the interval between the stopper holding members 25 and 26 becomes long which results in rendering the pressure cylinder 24 longer since the C-type welding gun 31 is fixedly held by the robot in association with the stopper holding members 25 and 26 which are protruding from the middle portion and the rear end of the pressure cylinder 24 for holding the bracket 23 provided at the tip end of the robot wrist 21 and the fixing cylinder 22.

In the second conventional device, there was such a problem that the C-type welding robot gun 52 is bulky in height since the C-type welding robot gun 52 is fixedly held by the robot utilizing the stopper holding member 42 and the protruding portion 48 of the pressure cylinder 47 which renders the fixing arm 49 to dispose at higher position.

SUMMARY OF THE INVENTION

The present invention has been made in view of the problems of the conventional apparatus and has an object to provide a C-type welding robot gun holding apparatus capable of reducing the longitudinal length of the pressure cylinder and the height of the fixing arm.

To achieve the above object, the C-type welding robot gun holding apparatus of the present invention comprises an L-shaped bracket provided at the tip end of a robot wrist, a rod end of a fixing cylinder being disposed over a pressure cylinder and directed toward one surface of a projection of the L-shaped bracket and a stopper holding member protruding from a rear end of the pressure cylinder and being directed toward a rear surface of the projection of the L-shaped bracket.

DESCRIPTION OF PREFERRED EMBODIMENT

Figure 1:
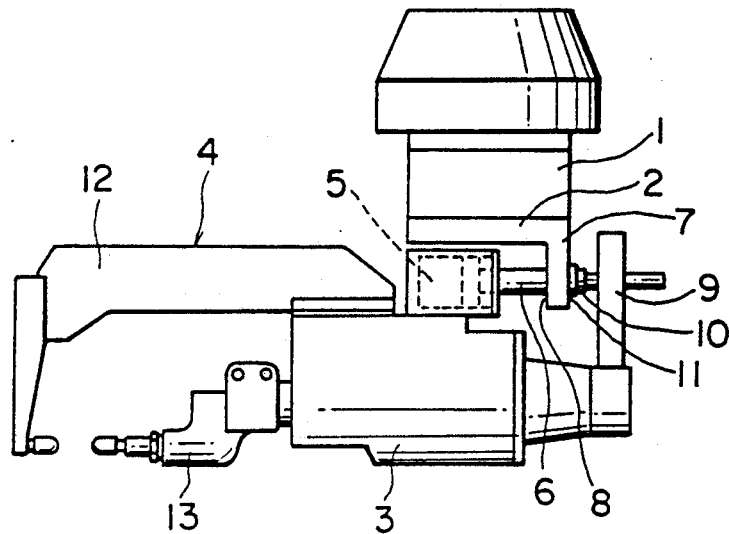
FIG. 1 is a side view of a C-type welding robot gun holding apparatus according to a preferred embodiment of the present invention.
Figure 2:
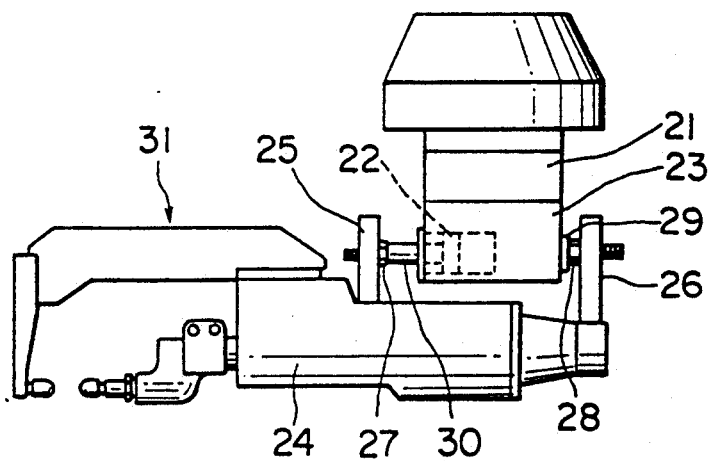
FIG. 2 side view of a first conventional apparatus.
Figure 3:
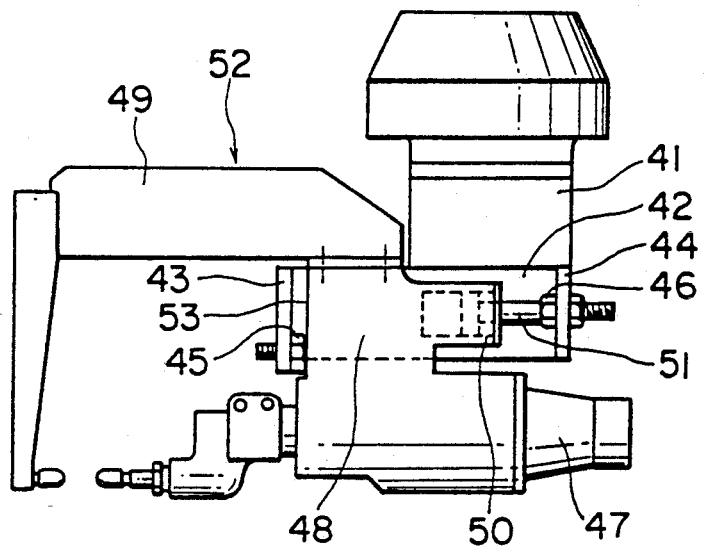
FIG. 3 is a side view of a second conventional apparatus.

A C-type welding gun holding apparatus according to a preferred embodiment of the present invention will be described with reference to FIG. 1.

The C-type welding robot gun holding apparatus comprises a robot wrist 1, an L-shaped bracket 2 fixedly attached to the robot wrist 1 and having projection 7, a pressure cylinder 3 for applying a force to one of electrodes and having a stopper holding member 9 protruding from a rear end thereof and a rod 13 at a front end thereof, a C-type welding robot gun 4 having a fixing arm 12 at a front portion thereof, a fixing cylinder 5 positioned between the bracket 2 and the cylinder 3 for fixedly positioning the C-type welding robot gun 4 and having a rod 6 directing to one surface 8 of the projection 7 and an adjustable stopper 10 positioned between the projection 7 of the bracket 2 and the stopper holding member 9 and directing to another surface i.e., a rear surface 11 of the projection 7 of the bracket 2.

When the C-type welding robot gun holding apparatus is moved, when it is free from the operation, by the robot, the rod 6 of the fixing cylinder 5 is permitted to extend to bring into contact with one surface 8 of the projection 7 of the L-shaped bracket 2 while the stopper 10 provided at the stopper holding member 9 protruding from the rear end of the pressure cylinder 3 brings into contact with the rear surface 11 of the projection 7 whereby the C-type welding robot gun is fixedly held by the robot.

With the arrangement of the C-type welding robot gun holding apparatus according to the present invention, the interval between the fixing cylinder 5 and the stopper holding member 9 is reduced, thereby reducing the length of the pressure cylinder since the C-type welding robot gun is fixedly held by the projection of the L-shaped bracket fixed to the robot at the front and rear surfaces thereof.

Furthermore, the fixing arm can be disposed at a relatively lower position since the C-type welding robot gun is not fixed to the protruding portion of the pressure cylinder, whereby the height of the C-type welding robot gun can be consequently reduced.

In conclusion, it is possible to obtain the C-type welding gun robot holding apparatus.

What is claimed is:

1. A C-type welding robot gun holding apparatus comprising:

a robot wrist having a tip end;

an L-shaped bracket fixed to said tip end of said robot wrist, said L-shaped bracket having a projection extending away from said robot wrist, said projection having a front surface and a rear surface;

a pressure cylinder disposed below said projection;

a fixing cylinder having a rod and disposed over said pressure cylinder, said fixing cylinder having a piston rod provided with a tip end, said tip end of said piston rod of said fixing cylinder being directed toward said front surface of said projection of said L-shaped bracket;

a stopper holding member protruding from the rear end of said pressure cylinder toward said projection; and a stopper provided on said stopper holding member and being directed toward said rear surface of said projection of said L-shaped bracket;

a fixing arm mounted on the upper side of said pressure cylinder and extending frontwardly therefrom, said fixing arm being located at substantially the same level, relative to said pressure cylinder, as said fixing cylinder.

2. A support apparatus for a C-type welding gun for a robot, comprising:

a robot wrist having a tip end;

an L-shaped bracket comprising a planar base wall having a front end and a rear end, said base wall being fixedly attached to said tip end of said robot wrist, said bracket also having a leg projecting from the rear end of said base wall, at a right angle thereto and in a direction away from said robot wrist;

a pressure cylinder located on the opposite side of said projection from said base wall and extending substantially parallel with said base wall, said pressure cylinder having a front end and a rear end;

a stopper holding member projecting from the rear end of said pressure cylinder toward said bracket, said stopper holding member extending parallel with said leg, being disposed in overlapping relationship therewith and being located rearwardly thereof, said pressure cylinder having a slidably movable piston rod projecting in the frontward direction therefrom for carrying a first welding electrode;

a fixing cylinder disposed between said base wall and said pressure cylinder, extending parallel therewith and being located in front of said leg, said fixing cylinder having a slidably movable piston rod projecting in the rearward direction therefrom toward said leg, said piston rod of said fixing cylinder being arranged to abut against the front surface of said leg;

an adjustable stopper mounted on said stopper holding member and projecting frontwardly toward the rear surface of said leg and being arranged to abut against the rear surface of said leg;

a fixing arm mounted on said pressure cylinder and extending forwardly therefrom parallel with said fixing cylinder and said pressure cylinder, said fixing arm being at the same level, relative to said pressure cylinder, as said fixing cylinder, said fixing arm being adapted to carry a second welding electrode.

* * * * *